US005236174A

United States Patent [19]

Vogt et al.

[11] Patent Number: 5,236,174

[45] Date of Patent: Aug. 17, 1993

[54] ELECTROMAGNETICALLY OPERABLE VALVE

[75] Inventors: Dieter Vogt, Korntal-Muenchingen; Ferdinand Reiter, Markgroeningen, both of Fed. Rep. of Germany; Rudolf Babitzka, Savigno/Bologna, Italy

[73] Assignee: Robert Bosch GmbH, Stuttgart, Fed. Rep. of Germany

[21] Appl. No.: 915,989

[22] PCT Filed: Jan. 19, 1991

[86] PCT No.: PCT/DE91/00043

§ 371 Date: Aug. 3, 1992

§ 102(e) Date: Aug. 3, 1992

[87] PCT Pub. No.: WO91/11604

PCT Pub. Date: Aug. 8, 1991

[30] Foreign Application Priority Data

Feb. 3, 1990 [DE] Fed. Rep. of Germany ....... 4003227

[51] Int. Cl.[5] .......................... F16K 31/06; B05B 1/32

[52] U.S. Cl. .......................... 251/129.21; 251/129.15; 239/585.1; 239/585.4; 239/585.5

[58] Field of Search ...................... 251/129.21, 129.15; 239/585.1, 585.4, 585.5

[56] References Cited

U.S. PATENT DOCUMENTS

| | | | |
|---|---|---|---|
| 4,915,350 | 4/1990 | Babitzka et al. | 251/129.21 X |
| 4,944,486 | 7/1990 | Babitzka | 251/129.21 |
| 5,170,987 | 12/1992 | Krauss et al. | 251/129.21 |

*Primary Examiner*—Arnold Rosenthal

*Attorney, Agent, or Firm*—Edwin E. Greigg; Ronald E. Greigg

[57] ABSTRACT

An electromagnetically operable valve having a core on which a magnet coil is arranged, an armature which acts on a valve closing body by means of a connecting pipe, in which the components to be welded together include a reduced diameter portion in which welding of the parts is by a laser in the reduced diameter portions.

22 Claims, 1 Drawing Sheet

ELECTROMAGNETICALLY OPERABLE VALVE

PRIOR ART

The invention is based on an electromagnetically operable valve. An electromagnetically operable valve has already been proposed in German Patent Application P 38 25 135.3, U.S. Pat. No. 4,967,966 in which soldering or welding of the armature to the connecting pipe, of the guide element to the core and to the connecting part, of the intermediate part to the core end and to the connecting part, and of the connecting part to the valve seating body are carried out. Because of the space requirement to be provided for the soldering or welding seams, the valve manufactured in this way has a large installed volume. During welding, there is a risk of the parts to be welded to one another deforming because of thermally induced stresses, but also of the necessary reliability of the connection not being ensured in the case of relatively large wall thicknesses of the parts which project over one another.

ADVANTAGES OF THE INVENTION

The valve according to the invention, has the advantage that reliable welding can be achieved and that the valve can be manufactured with relatively small dimensions in the radial and axial direction. The simplified welding in a reduction in cross-section permits a reduction in the heating of the parts to be welded and at the same time forms a safe and reliable connection. Deformation of the parts because of the temperature effect is thus largely prevented.

Advantageous developments and improvements of the valve specified are possible by means of the measures outlined hereinafter.

It is particularly advantageous to construct the reduction in cross-section as a welded groove which lies in the vicinity of one end of a part to be welded and is bounded at this end by a reinforcing collar. The welded groove according to the invention is not only easy to produce but the reinforcing collar is used at the same time as protection for the welded seam and the small wall thickness in the region of the reduction in cross-section. The position of the welded groove and hence also of the welded seam in the vicinity of the ends of the one part to be welded ensure a reliable connection.

It is also advantageous if the reinforcing collar has an insertion stage and/or a chamfer towards a central opening, in order to facilitate easier pushing together of two cylindrical or pipe-shaped parts which are to be welded to one another.

It is likewise advantageous if the valve seating body has a circumferential groove between the valve seat and a welded seam connecting the valve seating body to the connecting part. This reduction in the cross-sectional area reduces the heat flow during welding from the welded seam into the valve seat of the valve seating body, so that warping of the valve seat as a result of thermally induced stresses is prevented.

In this case it is advantageous if the cross-sectional area of the valve seating body between a treatment hole in the valve seating body and a groove base of the circumferential groove is less than one quarter of the cross-sectional area of the valve seating body which is formed between the contact line of the valve closing body resting against the valve seating area and the circumference of the valve seating body, in order to reduce the heat flow as much as possible, but without endangering the stability of the valve seating body.

It is particularly advantageous if the wall thickness of the reduction in cross-section of the one part to be welded is approximately 0.3 mm in the region of the weld, so that, on the one hand, a reliable weld is ensured, but on the other hand only a reduced heat supply is required during welding, because of the reduced wall thickness.

It is also advantageous if the wall thickness of the reduction in cross-section of the one part to be welded is significantly less than the wall thickness of the other part to be welded in the region of the weld, so that a reliable weld and the necessary heat dissipation are ensured by the considerably greater wall thickness of the other part.

It is particularly advantageous to provide a hollow identification element, which is manufactured from plastic, engages around the valve and is held thereon. The coloured configuration of the identification elements of valves allows rapid identification of the valve type during production, assembly or during storage of spare parts.

DRAWING

An exemplary embodiment of the invention is shown in simplified form in the drawing and is explained in detail in the following description.

FIG. 1 shows an exemplary embodiment of a valve designed according to the invention and FIG. 2 shows the welding according to the invention of two metallic parts of the valve which project over one another.

DESCRIPTION OF THE EXEMPLARY EMBODIMENT

Figure 1:
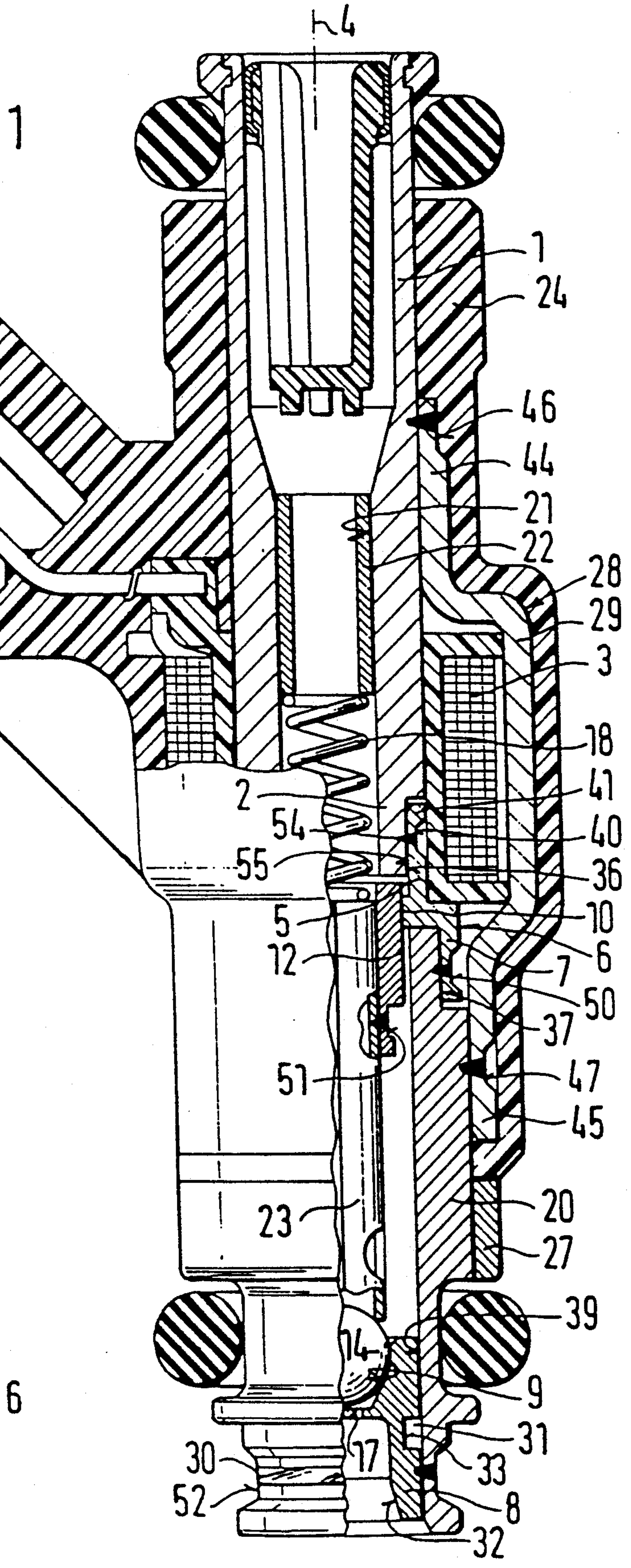

The electromagnetically operable valve, which is shown for example in FIG. 1, in the form of an injection valve for fuel injection systems of internal-combustion engines has a core 1, which is surrounded by a magnet coil 3, is of pipe-shaped construction, and via which the fuel is supplied. A first connecting section 5, surrounding the core end 2, of a pipe-shaped metallic intermediate part 6, which has a reduction 40 in cross-section on the circumference, is connected by a welded seam 54, which runs in the reduction 40 in cross-section and is produced by means of a laser, in a sealed manner to the core 1, concentrically with respect to a valve longitudinal axis 4 and adjacent to a lower core end 2 on which the magnet coil 3 is arranged.

Figure 2:
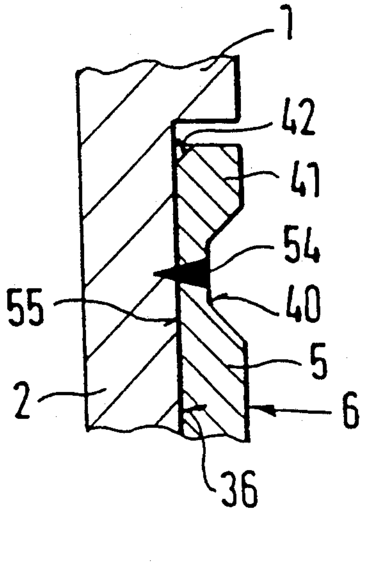

The weld according to the invention which is shown in FIG. 2 of two metallic parts of the valve projecting over one another is intended to apply to all welds of the valve in a suitably adapted form and shows, by way of example, the reduction 40 in cross-section, constructed as a welded groove, of the first connecting section 5, which reduction in cross-section is located in the vicinity of one end of the part, for example the intermediate part 6, and is bounded at this end by a reinforcing collar 41 which extends radially beyond the groove base. The reinforcing collar 41 is used as protection for the welded seam 54 and the small wall thickness of the reduction 40 in cross-section, of approximately 0.3 mm. If the reinforcing collar 41 has an insertion stage 42 and/or a chamfer towards the central opening 55 of the intermediate part 6, this makes assembly easier. The wall thickness of the other part to be welded, which is considerably greater than that of the reduction 40 in cross-section, in this case of the core end 2, permits a safe and reliable weld.

A second connecting section 7 of the intermediate part 6, which has a greater diameter than the first connecting section 5, engages around a pipe-shaped metallic connecting part and is connected thereto by means of a laser weld corresponding to the representation in FIG. 2, which is designed in a reduction 50 in cross-section which is constructed at the downstream end of the second connecting section 7. In order to make small external dimensions of the valve possible, the first connecting section 5 engages around a retaining step 36 of the core end 2, which has a smaller external diameter than the core 1, and the second connecting section 7 engages around a retaining step 37 of the connecting part 20, which is likewise constructed with a smaller external diameter than in the adjacent region.

A valve seating body 8, having a groove 31, is welded into a retaining hole 39 at the end of the connecting part 20 facing away from the core 1, the weld, which is produced by means of a laser, running in a reduction 52 in cross-section of the connecting part 20, as is shown by way of example in FIG. 2. In this case, the groove 31 lies between the valve seat 9 and the reduction 52 in cross-section. The juxtaposition of the core 1, the intermediate part 6, the connecting part 20 and the valve seating body 8 thus represents a compact, rigid metallic unit. At least one spray opening 17 is constructed in the valve seating body 8 downstream from the valve seat 9.

A displacement sleeve 22, which is pressed into a flow hole 21 of the core 1, is used for setting the spring pretension of a restoring spring 18 which rests against the displacement sleeve 22 and is supported on a connecting pipe 23 by means of its end which points downstream. An armature 12 is connected by laser welding to the end of the connecting pipe 23 facing the restoring spring 18, in the reduction 51 in cross-section of which armature, constructed facing away from the core end 2, a welded seam runs corresponding to that shown in FIG. 2. The pipe-shaped intermediate part 6, with a guide collar 10, is at the same time used as a guide for the armature 12. At the other end of the connecting pipe 23, said connecting pipe is connected to a valve closing body 14 for example by welding, which is constructed for example as a sphere and interacts with the valve seat 9.

The circumferential groove 31 in the valve seating body 8 results in the cross-sectional area of the valve seating body 8 between a treatment hole 32 of the valve seating body 8 and a groove base 33 of the circumferential groove 31 being less than one quarter of the cross-sectional area of the valve seating body 8 which is formed between the contact line of the valve closing body 14, which rests against the valve seating area, and the circumference of the valve seating body 8. This reduced cross-sectional area reduces the heat flow during welding from the welded seam 30 into the valve seat 9, so that warping of the valve seat 9 as a result of thermally induced stresses is prevented.

The magnet coil 3 is surrounded, completely in the axial direction and at least partially in the circumferential direction, by at least one guide element 28, which is used as a ferromagnetic element and is constructed in the exemplary embodiment as a clip. The guide element 28 is matched by means of its region 29 to the contour of the magnet coil 3, an upper end section 44 which extends radially inwards engages partially around the core 1, a lower end section 45 engaging partially around the connecting part 20. The upper end section 44 is connected by means of its end facing away from the valve closing body 14 to the core 1 by means of laser welding, the weld being constructed in a single reduction 46 in cross-section of the upper end section 44 running over only a part of the circumference of the guide element 28. The guide element 28 is connected by means of its lower end section 45 to the connecting part 20 in a reduction 47 in cross-section, by means of laser welding, for example corresponding to the weld shown in FIG. 2. Since the guide element 28 does not carry out any sealing function, a circumferential, sealed weld is not required, so that the reductions 46, 47 in cross-section on the upper end section 44 and the lower end section 45 also do not need to be constructed circumferentially. In a further exemplary embodiment, not shown here, it is also possible, in the same way as on the upper end section 44, to dispense with the construction of a welded groove running over the entire circumference of the guide element 28, on the lower end section 45 as well, and to provide only a single reduction in cross-section extending over only a part of the circumference of the guide element 28.

At least one part of the core 1 and the magnet coil 3 over its entire axial length are surrounded by a plastic sheath 24 which also surrounds at least the intermediate part 6 and a part of the connecting part 20. A pipe-shaped identification element 27, which partially surrounds the connecting part 20, is manufactured from coloured plastic and is held on the valve by a clamp, press or screw connection, is connected to said plastic sheath 24, which is produced by filling out or extrusion coating with plastic. The coloured identification of the valve permits rapid identification of the valve type during production, assembly or during storage of spare parts.

At the same time, an electrical connecting plug 26 is integrally formed on the plastic sheath 24, via which electrical contact is made with the magnet coil 3 and said coil is hence energised.

The laser welds according to the invention, which are carried out in reductions in cross-section, not only make a compact construction of the valve possible but are also distinguished by high safety and reliability as well as easy practicability.

The foregoing relates to a preferred exemplary embodiment of the invention, it being understood that other variants and embodiments thereof are possible within the spirit and scope of the invention, the latter being defined by the appended claims.

We claim:

1. An electromagnetically operable valve for fuel injection systems of internal-combustion engines, having a core (1) surrounded by a magnet coil (3), an armature (12) welded to a connecting pipe (23), a valve closing body (14) which interacts with a fixed valve seat (9) is welded to said connecting pipe, a core end facing said armature, a pipe-shaped metallic intermediate part (6) which is connected by means of an upper end to said end (2) of said core facing the armature and by means of a lower end is connected to a pipe-shaped connecting part (23) in a sealed manner by welding, at least one clip-shaped guide element (29), which engages over the magnet coil and is connected by means of a lower end facing the valve closing body to the connecting part (20), and is connected by means of an upper end to the core (1) by welding, a metallic valve seating body (8), which has a fixed valve seat (9), and is mounted on the connecting part (20) on an end facing away from the intermediate part by welding, said lower end of said armature (12) includes a reduced diameter portion in cross section which is welded to said connecting pipe (23), said upper and lower ends of said intermediate part include a reduced diameter portion which is welded to said lower end (2) of said core (1) and said connecting part (20), respectively, said upper and lower ends of said clip-shaped guide element (29) includes a reduced diameter portion which is welded to said core (1) and said connecting part (20), respectively, and said lower end of said connecting part (20) includes a reduced diameter portion which is welded to said valve seating body.

2. A valve according to claim 1 in which said intermediate part includes a reinforcing collar (41) juxtaposed said reduced diameter portion.

3. A valve as set forth in claim 2, in which said reinforcing collar includes an insertion stage (42) with a chamfer towards a central opening (55).

4. A valve according to claim 1, in which the valve seating body (8) has a circumferential groove (31) between the valve seat (9) and a welded seam (30) which connects the valve seating body (8) to the connecting part (20).

5. A valve according to claim 2, in which the valve seating body (8) has a circumferential groove (31) between the valve seat (9) and a welded seam (30) which connects the valve seating body (8) to the connecting part (20).

6. A valve according to claim 3, in which the valve seating body (8) has a circumferential groove (31) between the valve seat (9) and a welded seam (30) which connects the valve seating body (8) to the connecting part (20).

7. A valve according to claim 4, in which the cross-sectional area of the valve seating body (8) between a treatment hole (32) in the valve seating body (8) and a groove base (33) of the circumferential groove (31) is less than one quarter of the cross-sectional area of the valve seating body (8) which is formed between the contact line of the valve closing body (14) resting against the valve seating surface and the circumference of the valve seating body (8).

8. A valve according to claim 5, in which the cross-sectional area of the valve seating body (8) between a treatment hole (32) in the valve seating body (8) and a groove base (33) of the circumferential groove (31) is less than one quarter of the cross-sectional area of the valve seating body (8) which is formed between the contact line of the valve closing body (14) resting against the valve seating surface and the circumference of the valve seating body (8).

9. A valve according to claim 6, in which the cross-sectional area of the valve seating body (8) between a treatment hole (32) in the valve seating body (8) and a groove base (33) of the circumferential groove (31) is less than one quarter of the cross-sectional area of the valve seating body (8) which is formed between the contact line of the valve closing body (14) resting against the valve seating surface and the circumference of the valve seating body (8).

10. A valve according to claim 1, in which the wall thickness of the reduced diameter portions in cross-section is approximately 0.3 mm.

11. A valve according to claim 2, in which the wall thickness of the reduced diameter portions in cross-section is approximately 0.3 mm.

12. A valve according to claim 3 in which the wall thickness of the reduced diameter portions in cross-section is approximately 0.3 mm.

13. A valve according to claim 4, in which the wall thickness of the reduced diameter portions in cross-section is approximately 0.3 mm.

14. A valve according to claim 7, in which the wall thickness of the reduced diameter portions in cross-section is approximately 0.3 mm.

15. A valve according to claim 10, in which the wall thickness of the reduced diameter portions in cross-section of the one part to be welded is significantly less than the wall thickness of the part without a reduced diameter.

16. A valve according to claim 1, in which said valve includes a hollow identification element (27), which is manufactured from plastic and which engages around the valve and is held thereon.

17. A valve according to claim 2, in which said valve includes a hollow identification element (27), which is manufactured from plastic and which engages around the valve and is held thereon.

18. A valve according to claim 3, in which said valve includes a hollow identification element (27), which is manufactured from plastic and which engages around the valve and is held thereon.

19. A valve according to claim 4, in which said valve includes a hollow identification element (27), which is manufactured from plastic and which engages around the valve and is held thereon.

20. A valve according to claim 7, in which said valve includes a hollow identification element (27), which is manufactured from plastic and which engages around the valve and is held thereon.

21. A valve according to claim 10, in which said valve includes a hollow identification element (27), which is manufactured from plastic and which engages around the valve and is held thereon.

22. A valve according to claim 15, in which said valve includes a hollow identification element (27), which is manufactured from plastic and which engages around the valve and is held thereon.

* * * * *